US012645496B2

(12) United States Patent
Cully et al.

(10) Patent No.: US 12,645,496 B2
(45) Date of Patent: Jun. 2, 2026

(54) PRE-EMPTIVE SCHEDULING OF WORKLOADS TO ENABLE IMPROVED SHARING OF RESOURCES

(71) Applicant: VMware, Inc., Palo Alto, CA (US)

(72) Inventors: Aidan Cully, St. Augustine, FL (US); Earl Campbell Ruby, III, Walnut Creek, CA (US)

(73) Assignee: VMware LLC, Palo Alto, CA (US)

( * ) Notice: Subject to any disclaimer, the term of this patent is extended or adjusted under 35 U.S.C. 154(b) by 564 days.

(21) Appl. No.: 18/186,709

(22) Filed: Mar. 20, 2023

(65) Prior Publication Data

US 2023/0393898 A1 Dec. 7, 2023

Related U.S. Application Data

(60) Provisional application No. 63/349,002, filed on Jun. 3, 2022.

(51) Int. Cl.
*G06F 9/50* (2006.01)
*G06F 9/46* (2006.01)
*G06F 9/48* (2006.01)

(52) U.S. Cl.
CPC ................. *G06F 9/50* (2013.01); *G06F 9/46* (2013.01); *G06F 9/461* (2013.01); *G06F 9/48* (2013.01); *G06F 9/4806* (2013.01); *G06F 9/4831* (2013.01); *G06F 9/4843* (2013.01); *G06F 9/5022* (2013.01); *G06F 9/5038* (2013.01); *G06F 9/505* (2013.01); *G06F 9/5072* (2013.01)

(58) Field of Classification Search
CPC ... G06F 9/46; G06F 9/461; G06F 9/48; G06F 9/4806; G06F 9/4831; G06F 9/4843; G06F 9/50; G06F 9/5022; G06F 9/5038; G06F 9/505; G06F 9/5072
See application file for complete search history.

(56) References Cited

U.S. PATENT DOCUMENTS

| | | | | |
|---|---|---|---|---|
| 8,954,968 B1* | 2/2015 | Pohl | .................... | G06F 11/3419 |
| | | | | 718/103 |
| 2012/0137289 A1* | 5/2012 | Nolterieke | ............ | G06F 9/5094 |
| | | | | 718/1 |
| 2013/0232495 A1* | 9/2013 | Rossbach | .............. | G06F 9/5044 |
| | | | | 718/102 |
| 2015/0154056 A1* | 6/2015 | Chen | ..................... | G06F 9/4856 |
| | | | | 718/103 |
| 2017/0315846 A1* | 11/2017 | Wang | .................... | G06F 15/177 |
| 2018/0314547 A1* | 11/2018 | Bak | ........................ | G06F 9/4881 |
| 2020/0272512 A1* | 8/2020 | Rohleder | ............ | G06F 13/1668 |
| 2021/0073047 A1* | 3/2021 | Bhandaru | ............. | G06F 9/5044 |
| 2022/0308936 A1 | 9/2022 | Cully et al. | | |

* cited by examiner

*Primary Examiner* — Charles M Swift
(74) *Attorney, Agent, or Firm* — Kim & Stewart LLP

(57) ABSTRACT

A pre-emptive scheduling of workloads enables improved sharing of resources of a cluster of hosts. The steps of this pre-emptive scheduling method include: adjusting priority of active workloads that are each running on one of the nodes and idle workloads that have been suspended; determining that a priority of a first workload, which is one of the idle workloads, exceeds a priority of a second workload, which is one of the active workloads and is executing on a first node of the cluster of nodes; and suspending the second workload and resuming the first workload to run on the first node.

20 Claims, 6 Drawing Sheets

PRE-EMPTIVE SCHEDULING OF WORKLOADS TO ENABLE IMPROVED SHARING OF RESOURCES

CROSS-REFERENCE TO RELATED APPLICATION(S)

This application claims the benefit of U.S. Provisional Patent Application No. 63/349,002, filed Jun. 3, 2022, the entire contents of which are incorporated by reference herein.

BACKGROUND

Data volume is increasing due to artificial intelligence (AI) and machine learning (ML) applications. This increase in data volume requires a commensurate increase in compute power. However, microprocessors cannot supply the needed compute power. Consequently, accelerator hardware, e.g., graphics processing units (GPUs), are taking over many of the compute tasks.

In U.S. patent application Ser. No. 17/493,741, filed Oct. 4, 2021, which is incorporated by reference herein in its entirety, an application with specialized workloads, e.g., AI and ML workloads, is co-executed between an initiator node and an acceptor node equipped with the accelerator hardware. When a plurality of applications with specialized workloads is executed across a plurality of nodes, the resources of the nodes, including the accelerator hardware, will need to be shared. When a particular node lacks the capacity to execute a workload, the workload may be migrated to another node that has sufficient resources to execute the workload. However, migration has inherent delays because it requires the transfer of the entire state of the workload over a network. In some situations, migration itself might not be feasible because there may not be another node that has sufficient resources to execute the workload.

SUMMARY

One or more embodiments provide pre-emptive scheduling of workloads to enable improved sharing of resources. For example, when a workload that is executing on a node equipped with a GPU or some other accelerator hardware becomes idle, the execution of that workload is suspended, so that another workload may be scheduled to be executed on that node equipped with the accelerator hardware.

A method of scheduling a plurality of workloads for execution in a cluster of nodes, according to an embodiment, includes: adjusting priority of active workloads that are each running on one of the nodes and idle workloads that have been suspended; determining that a priority of a first workload, which is one of the idle workloads, exceeds a priority of a second workload, which is one of the active workloads and is executing on a first node of the cluster of nodes; and suspending the second workload and resuming the first workload to run on the first node.

Further embodiments include a computer-readable medium containing instructions that, when executed by a computing device, cause the computing device to carry out one or more aspects of the above method, and a system comprising a memory and a processor configured to carry out one or more aspects of the above method.

DETAILED DESCRIPTION

In the embodiments, workloads that are executed in a node having special hardware, e.g., GPU or other accelerator hardware, are scheduled for execution using a work queue and according to a priority policy. A workload that is executing on the node is suspended when it becomes idle so that other workloads can be scheduled for execution on that node. At a later time, the workload can be rescheduled for execution on the node or another node when its priority exceeds that of a currently executing workload.

Figure 1:
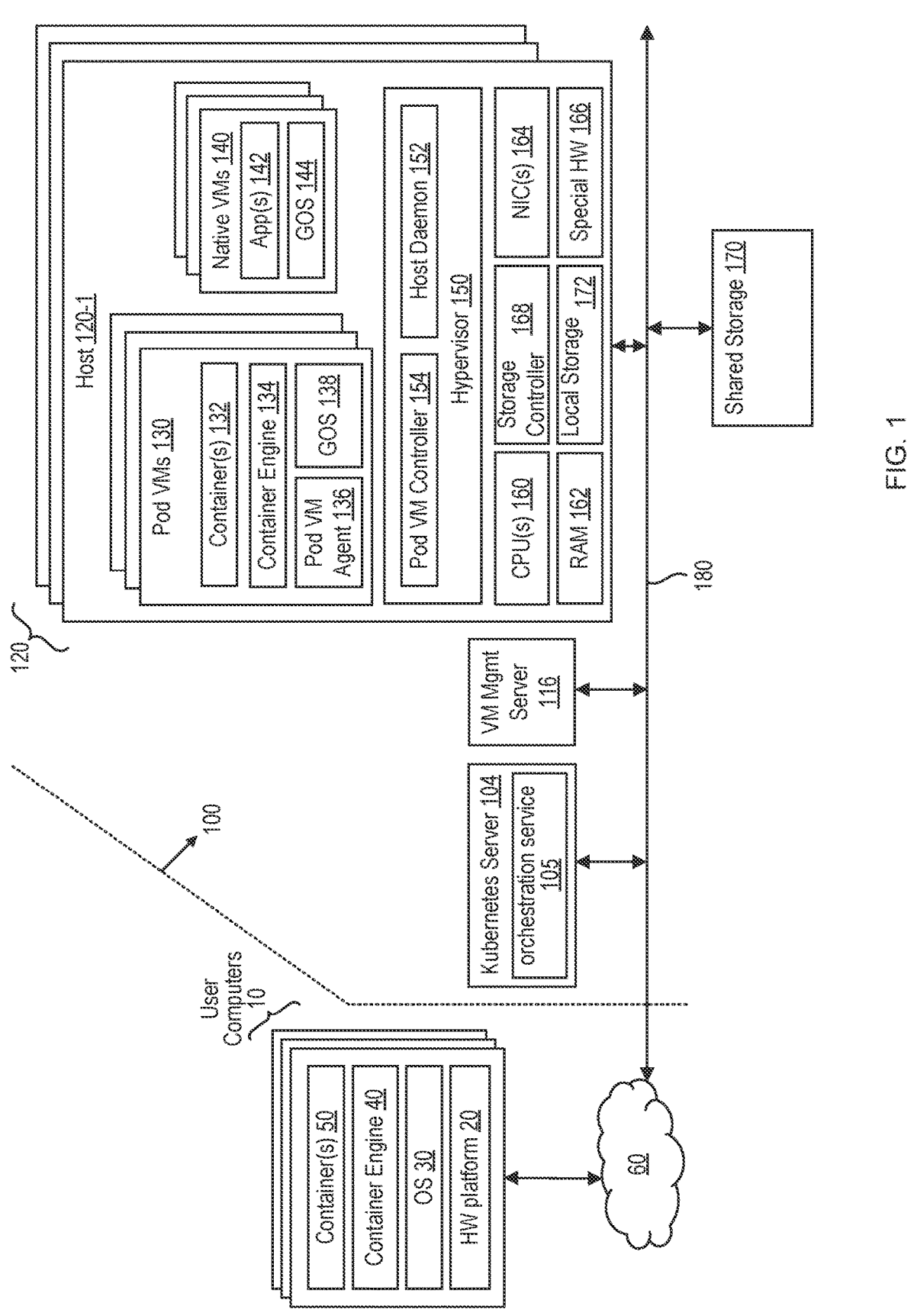
FIG. 1 is a block diagram of user computers connected to a clustered container host system in which embodiments may be implemented.

FIG. 1 is a block diagram of user computers 10 connected to a clustered container host system 100 in which embodiments may be implemented. As depicted, user computers 10 access clustered container host system 100 over a public network 60, e.g., the Internet. Clustered container host system 100 includes a cluster of hosts 120 which may be constructed on a server-grade hardware platform such as an x86 or ARM® architecture platform. The hardware platform includes one or more central processing units (CPUs) 160, system memory (e.g., random access memory (RAM) 162, one or more network interface controllers (NICs) 164, and special hardware 166, e.g., GPU or some other accelerator hardware. A virtualization software layer, also referred to herein as a hypervisor 150, is installed on top of the hardware platform. The virtualization software layer supports a virtual machine execution space within which multiple VMs may be concurrently instantiated and executed. All of hosts 120 are configured in a similar manner as host 120-1, and they are not separately described herein.

In the embodiment illustrated in FIG. 1, each host 120 accesses its local storage (e.g., hard disk drives or solid-state drives) 172 via its local storage controller 168 and accesses shared storage 170 through its NIC 164 and network 180. In another embodiment, each host 120 contains a host bus adapter (HBA) through which input/output operations (IOs) are sent to shared storage 170 through a storage area network (SAN). Shared storage 170 may comprise, e.g., magnetic disks or flash memory, that is connected to network 180 or the SAN. In some embodiments, the local storage devices of hosts 120 may be aggregated and provisioned as a virtual SAN device that is accessed by hosts 120 as shared storage 170.

VM management server 116 is a physical or virtual server that provisions the VMs from the hardware resources of hosts 120. VM management server 116 logically groups hosts 120 into a cluster to provide cluster-level functions to hosts 120, such as load balancing across hosts 120 by performing VM migration between hosts 120, distributed power management, dynamic VM placement according to affinity and anti-affinity rules, and high-availability. The number of hosts 120 in the cluster may be one or many.

In FIG. 1, a Kubernetes® system, which is implemented in the cluster of hosts 120, is depicted as an example of clustered container host system 100. In this system, Kubernetes server 104 is a virtual server (e.g., one of VMs provisioned by VM management server 116) that communicates with pod VM controllers (e.g., pod VM controller 154 of host 120-1) installed in hosts 120 via network 180. In some embodiments, the Kubernetes server is distributed over the nodes, thus having no single point of failure. An application commonly known as kubectl runs on user computers 10 and an application administrator or developer (hereinafter referred to as the "user"), employs kubectl, and a configuration file (which contains the credentials to authenticate with the Kubernetes server) can issue commands to the Kubernetes server. For example, through kubectl, the user submits desired states of the Kubernetes system, e.g., as YAML documents, to Kubernetes server 104. In response, Kubernetes server 104 schedules pods onto (i.e., assigns them to) different hosts 120 (which are also nodes of a Kubernetes cluster in the embodiments). The pod VM controllers of the different hosts 120 periodically poll Kubernetes server 104 to see if any of the pods have been scheduled to the node (in this example, the host) under its management and execute tasks to bring the actual state of the pods to the desired state. In the embodiments, pods are implemented as pod VMs, which are further described below.

Hypervisor 150 of host 120-1 includes a host daemon 152 and a pod VM controller 154. Host daemon 152 communicates with VM management server 116 to instantiate VMs (both pod VMs 130 and native VMs 140). Each pod VM 130 includes a container engine 134 running on top of guest operating system 138. In addition, a pod VM agent 136 of pod VM 130 communicates with pod VM controller 154 to spin up a set of containers 132 to run in or delete a set of containers 132 running in an execution space managed by container engine 134. Each native VM 140 is an ordinary VM (as distinguished from pod VMs), which includes a guest operating system 144 and applications (e.g., non-containerized applications) running on top of guest operating system 144.

Figure 3:
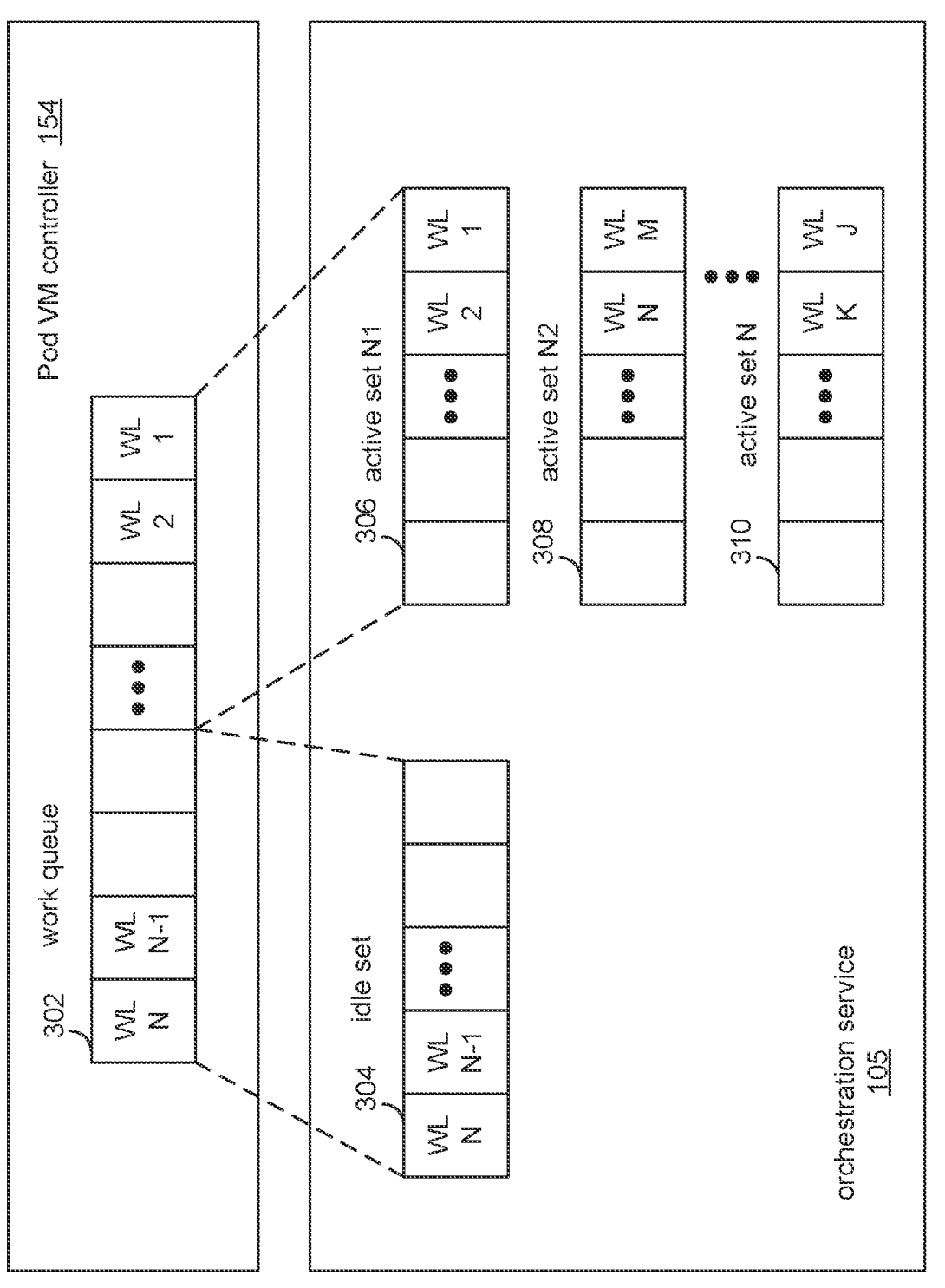
FIG. 3 depicts a work queue for a particular node, and idle and active sets of workloads that are tracked by an orchestration service, according to embodiments.

The lifecycle of native VMs 140 is managed by VM management server 116 through host daemon 152. In contrast, the lifecycle of pod VMs 130 is managed by pod VM controller 154 according to the desired state communicated thereto by Kubernetes server 104. In the embodiments, in addition to managing the lifecycle of pod VMs 130, pod VM controller 154 also manages a work queue, which is depicted in FIG. 3, and determines when to suspend and resume pod VMs 130 according to entries in the work queue.

Figure 2:
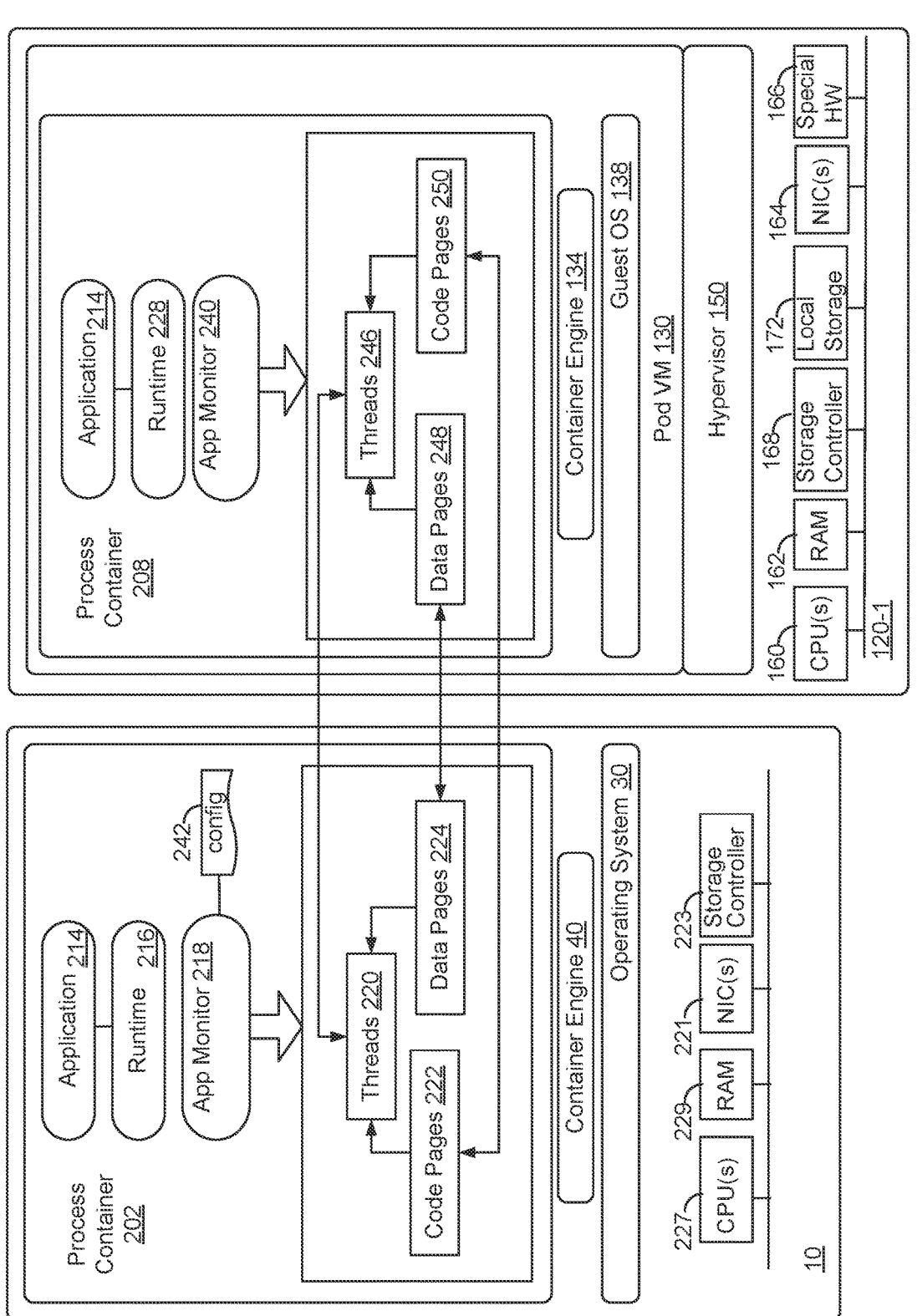
FIG. 2 depicts an application that is co-executed between an initiator node and an acceptor node.

FIG. 2 depicts an application that is co-executed between an initiator node and an acceptor node. User computer 10 is an example of an initiator node, and hosts 120 are examples of acceptor nodes. In user computer 10, operating system 30 runs on top of hardware platform 20 of user computer 10, which includes one or more CPUs 227, system memory (e.g., RAM) 229, one or more NICs 221, and a storage controller 223 connected to local storage (not shown). Process container 202 is a container that runs in an execution space managed by container engine 40. Process container 208 runs in the acceptor node and is a container that runs in an execution space managed by container engine 134 of pod VM 130.

Application 214 is co-executed by process container 202 running in the initiator node and process container 208 running in the acceptor node. In the embodiments depicted herein, process container 208 is spun up in pod VM 130 of host 120-1 because host 120-1 is equipped with much higher processing power than the initiator node and special hardware 166 (e.g., GPU). The initiator node includes a runtime 216 and application monitor 218, one or more threads of execution 220, code pages 222, and data pages 224. The acceptor node includes a runtime 228 and application monitor 240, one or more threads of execution 246, code pages 250, and data pages 248.

Process containers 202, 208 typically run in a lightweight virtual machine or in a namespace provided by an operating system such as the Linux® operating system. In one embodiment, process containers 202, 208 are Docker® containers, runtimes 216, 228 are Python virtual machines, application 214 is a Python program, with libraries such as TensorFlow or PyTorch, and threads of execution 220, 246 correspond to the threads of the Python virtual machine. Application monitor 218 includes a dynamic linker (DL). In general, a dynamic linker is a part of the operating system that loads and links libraries and other modules as needed by an executable code while the code is being executed.

Before co-executing application 214 between the initiator node and the acceptor node, the two nodes are set up. Setup of the initiator node and the acceptor node includes establishing the application monitor and runtimes on each of the nodes on which libraries or other deployable modules are to run, the coherent memory spaces in which the application, libraries, or other deployable modules are located, and the initial thread of execution of each runtime. After the setup is completed, in the course of executing the application on the initiator node, a library or other deployable module is executed on the acceptor node. Additional details of co-executing application 214 between the initiator node and the acceptor node are described in U.S. patent application Ser. No. 17/493,741.

FIG. 3 depicts a work queue for a particular node, and idle and active sets of workloads that are tracked by orchestration service 105, according to embodiments. In the embodiment illustrated herein, pod VMs are examples of workloads, and a pod VM controller of a node manages the work queue for that node. Each entry of the work queue contains a descriptor for the workload and a priority of the workload. The work queue has entries for idle workloads and entries for active workloads. Orchestration service 105 tracks the idle workloads of all nodes in idle set 304, and tracks the active workloads in active sets 306, 308, 310 on a per-node basis.

Figure 4:
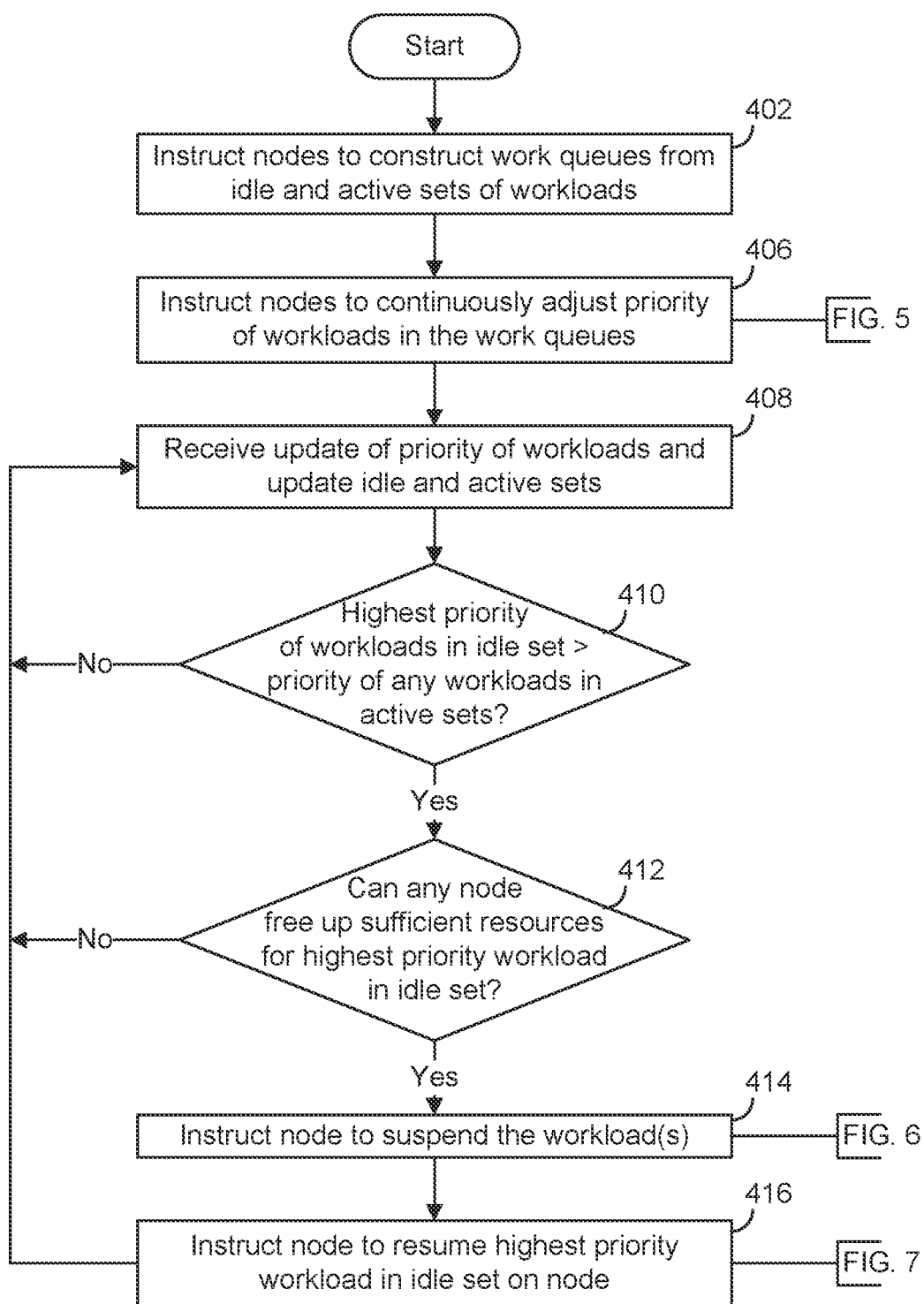
FIG. 4 depicts a flow of operations carried out by the orchestration service, according to embodiments.

FIG. 4 depicts a flow of operations of orchestration service 105, according to embodiments. In step 402, orchestration service 105 instructs each of the nodes, in particular the pod VM controller of each node, to construct a work queue. In response, the pod VM controller constructs the work queue with entries for the idle workloads corresponding to those in idle set 304 and entries for the active workloads corresponding to active workloads running therein. Each entry in these work queues contains a descriptor of one of the idle and active workloads and an initial priority assigned to that idle or active workload. Then, in step 406, orchestration service 105 instructs the pod VM controller of each node to continuously adjust priority of workloads in its respective work queue. In response, the pod VM controller of each node carries out the steps of FIG. 5 (described below), which includes the step of sending the adjusted priority to orchestration service 105.

The initial priority is a function of the time the workload has been running and a list of utilizations of each resource measured over time, with the utilization weighted more heavily than the currently measured utilization of the resource. For example, the utilization of a resource, such as the CPU or the GPU, assigns the historical value of the utilization of the resource a 25% weight while the current (just updated) utilization of the resource is given a 75% weight. An example of the priority function is a function that computes the quotient of time and the logarithm of the product of utilization of resources in the list. Such a function results in a priority that becomes lower as time elapses and utilization decreases.

Still referring to FIG. 4, in step 408, orchestration service 105 receives each adjusted priority and updates the priority of the corresponding workload in the idle and active sets. After doing so, orchestration service 105 executes step 410 to determine if the highest priority of the workloads in the idle set is greater than the priority of any of the workloads in the active sets. If so (step 410, Yes), orchestration service 105 looks for a node with one or more workloads in the active set (which have lower priority than the highest priority workload in the idle set), that would have sufficient resources freed up to support the execution of the highest priority workload in the idle set if the lower priority active workloads are suspended. The resources that need to be freed up may be CPU cycles, RAM, disk space, or special hardware such as GPU or accelerator hardware. Therefore, in step 412, orchestration service 105 communicates with each node that is executing the lower priority active workloads to determine if sufficient resources can be freed up. If there is such a node (step 412, Yes), orchestration service 105 instructs that node to suspend the lower priority active workloads, and in response, the pod VM controller of that node carries out the steps of FIG. 6 (described below). If there is no such node (step 412, No), the flow of operations in FIG. 4 returns to step 408.

Upon receiving notification from the node suspending the lower priority active workloads that they have been suspended, orchestration service 105 in step 416 instructs the node to resume the highest priority workload in the idle set in that node. In response, the pod VM controller of that node carries out the steps of FIG. 7 (described below). After step 416, the flow of operations returns to step 408, where orchestration service 105 waits for the next update to the priority of workloads.

Figure 5:
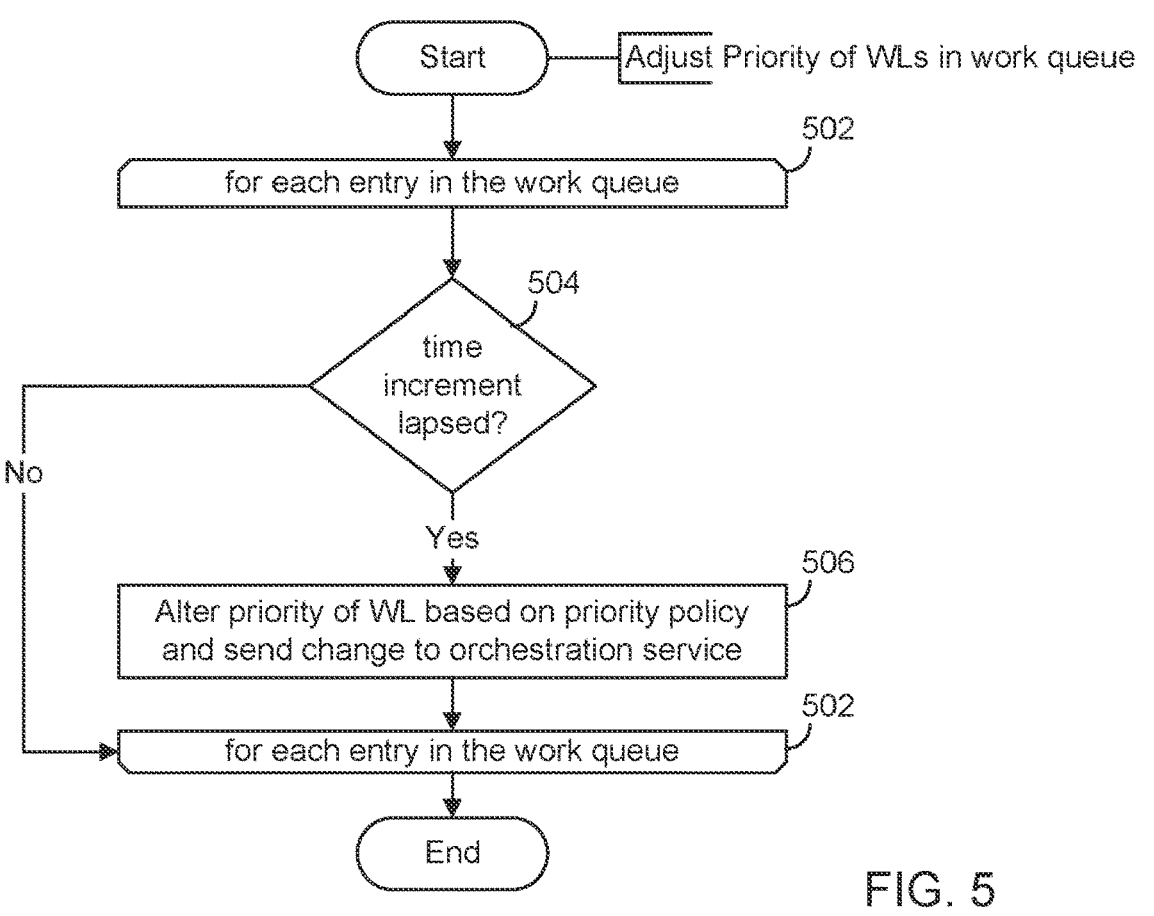
FIG. 5 depicts a flow of operations for adjusting the priority of workloads, according to embodiments.

FIG. 5 depicts a flow of operations carried out by a pod VM controller for adjusting the priority of workloads stored in the entries of the work queue, according to embodiments. In step 502, an iterator over the entries in work queue 302 is established. If a time increment has lapsed, as determined in step 504, the priority of the workload is lowered or raised according to a priority policy, and any priority changed by the pod VM controller is sent to orchestration service 105 (step 506).

In one embodiment, the priority policy calls for lowering the priority of a workload running on a node (i.e., active) by the pod VM controller of that node, at a rate, A, and raising the priority of a workload that is runnable but not active (i.e., not running on any node) by orchestration service 105, at a rate, B. The priority policy also calls for lowering the priority of a workload running on a node by the pod VM controller of that node, at a rate, C, if a critical resource of the node (e.g., GPU) is not being used by the running workload, and raising the priority by the pod VM controller of that node, at a rate, D, if the critical resource of the node is being used by the running workload. The rates A, B, C, and D, are user-configurable numbers greater than zero; in some embodiments, they depend on a 'niceness' number given to the workload. The niceness number provides a mechanism for different workloads to have their priority change in different ways, to give certain workloads higher or lower priority than they would otherwise get.

Rates A and B have a comparable value, and rates C and D have a comparable value. For example, A=3*B and D=3*C. Also, A and B are larger than C and D. For example, A=50*D. These values favor maintaining running workloads instead of suspending them and restoring a different workload.

Figure 6:
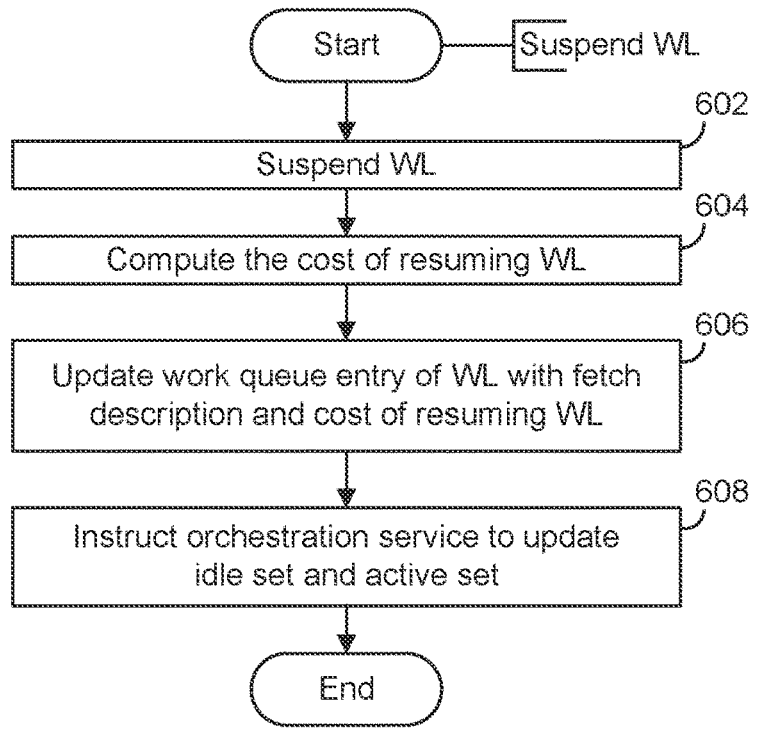
FIG. 6 depicts a flow of operations for suspending a workload, according to embodiments.

FIG. 6 depicts a flow of operations carried out by a pod VM controller for suspending a workload, according to embodiments. In step 602, in response to an instruction to suspend a workload, the pod VM controller suspends the workload by invoking a scheduler of its node to suspend execution of the workload and then evicting a portion or all of the executing image of the workload that is in memory to storage (e.g., shared storage 170), depending on how much memory resources need to be freed up. The amount of memory resources that need to be freed up may be indicated as a parameter of the instruction for suspending the workload. In step 604, the pod VM controller computes the cost of resuming the workload as the size of the executing image that has been evicted to storage. Accordingly, the cost of resuming the workload increases as more of the executing image of the workload is evicted to storage.

In step 606, the pod VM controller updates its work queue so that the entry for the suspended workload in the work queue is updated with a fetch description that describes how to restore the executing image of the suspended workload, the cost of doing so (i.e., the cost of resuming computed in step 604). After the work queue has been updated, the pod VM controller in step 608 instructs orchestration service 105 to update the idle and active sets of workloads. In response, orchestration service 105 adds the entry for the suspended workload to idle set 304 and removes the entry for the suspended workload from one of the active sets corresponding to the node where the workload is now idle.

Figure 7:
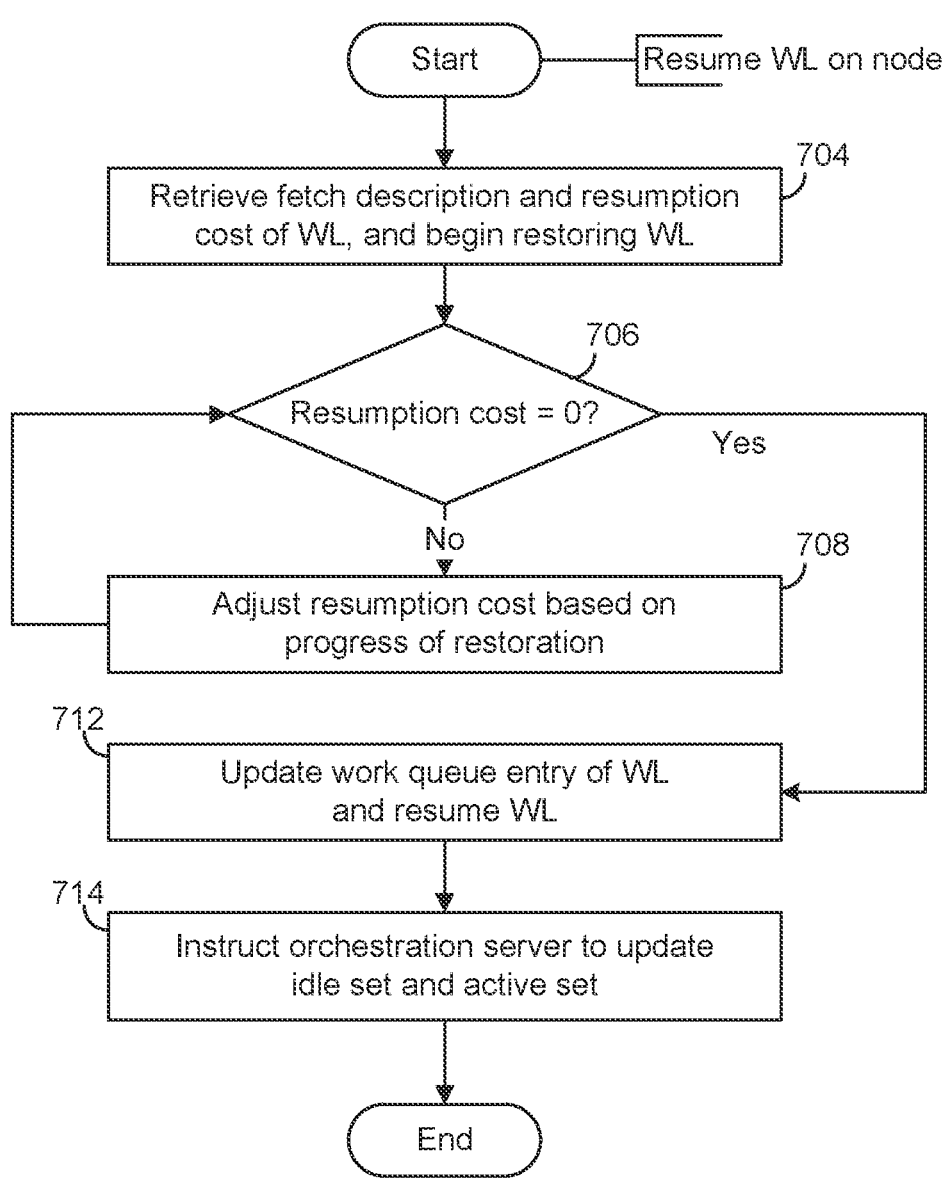
FIG. 7 depicts a flow of operations for resuming a workload, according to embodiments.

FIG. 7 depicts a flow of operations carried out by a pod VM controller for resuming a workload, according to embodiments. In step 704, in response to an instruction to resume a workload, the pod VM controller accesses the entry of its work queue corresponding to the workload to retrieve the fetch description and the resumption cost stored therein, and begins restoring the workload, i.e., copying the portion of the executing image of the workload that is in storage to memory. While restoring the workload, the pod VM controller continually adjusts the resumption cost based on the progress of restoration, i.e., how much more of the executing image of the workload that needs to be copied to memory to completely restore the entire executing image of the workload in memory. Steps 706 and 708 are carried out until the resumption cost reaches zero.

When the resumption cost reaches zero, indicating that the entire executing image of the workload has been restored in memory, the pod VM controller in step 712 updates its work queue so that the entry for the restored workload indicates that the restored workload is active, and resumes the execution of the restored workload by invoking a scheduler of its node to execute the restored workload. Then, in step 714, the pod VM controller instructs orchestration service 105 to update the idle and active sets of workloads. In response, orchestration service 105 removes the entry for the restored workload from idle set 304 and adds the entry for the restored workload in one of the active sets corresponding to the node where the restored workload is now active.

In the embodiments described above, if none or only a part of the executing image of a suspended workload was evicted to storage, the fetch description will identify the node where the workload was suspended and whether or not the memory containing the executing image of the suspended workload is private to that node. In addition, the fetch description may store a representation of a part of the executing image of the suspended workload so that such part of the executing image of the suspended workload need not be saved in storage during the process of suspending the workload. For example, one or more files in storage may be representative of a part of the executing image of the suspended workload. In such a case, the fetch description contains pointers to such files saved in storage. In another example where the file system itself is derived from a container image, the file system state itself may be restored from storage without having to copy the file system state to storage during the process of suspending the workload. In such a case, the fetch description contains a pointer to the container image location.

In some embodiments, a hypervisor may provision a virtual hardware platform including a virtual GPU for a pod VM. When this pod VM is suspended, the entire GPU state is saved in a backing file in storage, and the fetch description for restoring this pod VM indicates the location of the backing file. When it is necessary to resume this pod VM on a particular node because that node has retained some of the state of this pod VM in memory, but that node does not have sufficient resources, the retained state of this pod VM is migrated to another node. During migration, the GPU state does not need to be migrated. Instead, the migration destination node restores the GPU state by reading the backing file from the location in storage indicated in the fetch description.

More generally, when a workload is to be resumed on a particular node because that node has retained some of the state of this workload in memory, but that node does not have sufficient resources, this workload is migrated, to another node. During migration, the state of this workload is restored in the migration destination node by migrating the part of the workload state that is in the memory of the migration source node to the migration destination node and restoring the rest of the workload state from storage.

In the embodiments described above, pre-emptive scheduling of workloads to enable improved sharing of resources is implemented in a Kubernetes system. It should be understood that other implementations that do not employ Kubernetes are possible. In these other implementations, accelerator hardware is assigned to nodes of a multi-node system. The nodes can be VMs or physical machines running a conventional operating system, and each node has a service that reports to a manager service (running on one of the nodes) what accelerator hardware is available and how well they are utilized at any given moment. In these implementations, the manager service is responsible for selecting an acceptor node from one of the nodes of the multi-node system in accordance with the requirements of the initiator node, and instructs a scheduler service running on the acceptor node to deploy an acceptor container (e.g., process container 208).

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer-readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of scheduling a plurality of workloads for execution in a cluster of nodes, the method comprising:

at each of the nodes, adjusting priority of first workloads that are each running thereon and adjusting priority of second workloads that have been suspended, wherein the nodes include a first node that is adjusting the priority of a first subset of the first workloads that are running on the first node and is adjusting the priority of all of the second workloads, and a second node that is adjusting the priority of a second subset of the first workloads that are running on the second node and is adjusting the priority of all of the second workloads;

at a central orchestrator, receiving the priorities of the first and second workloads from each of the nodes, including the priorities of the first workloads in the first subset and the priorities of the second workloads from the first node, and the priorities of the first workloads in the second subset and the priorities of the second workloads from the second node, and determining that a priority of a suspended workload, which is one of the second workloads, exceeds a priority of an active workload, which is one of the first workloads;

determining, by the central orchestrator, that one of the nodes on which the active workload is running has sufficient resources to execute the suspended workload if the active workload running thereon is suspended; and instructing, by the central orchestrator, the one node to suspend the active workload running thereon and resume running the suspended workload thereon.

2. The method of claim 1, wherein the first node is equipped with accelerator hardware and the priority of each of the first workloads running on the first node is adjusted at the first node according to usage of the accelerator hardware by the respective first workload.

3. The method of claim 2, wherein, at the first node, the priority of one of the first workloads running on the first node is increased if the accelerator hardware is used by the respective first workload during a time interval and is decreased if the accelerator hardware is not being used by the respective first workload during the time interval.

4. The method of claim 3, wherein, at the first node, the priority of each of the first workloads running on the first node is continuously decreased over time.

5. The method of claim 4, wherein, at each of the nodes, the priority of each of the second workloads is continuously increased over time.

6. The method of claim 1, further comprising:

prior to resuming the running of the suspended workload on the one node, suspending a third workload, which is one of the first workloads and is executing on the one node, wherein the priority of the third workload is lower than the priority of the active workload.

7. The method of claim 6, wherein resources of the one node freed up by suspending the active workload is less than resources required to resume the running of the suspended workload on the one node, and resources of the one node freed up by suspending the active and third workloads are greater than or equal to the resources required to resume the running of the suspended workload on the one node.

8. The method of claim 1, wherein the active workload is suspended by saving an entire executing image of the second active workload in storage.

9. The method of claim 1, wherein the active workload is suspended by saving a first part of an executing image of the active workload in storage and retaining a second part of the executing image of the active workload in memory of the one node.

10. The method of claim 9, further comprising:

determining that a priority of the active workload after being suspended exceeds a priority of a third workload, which is one of the first workloads and is executing on the second node; and resuming running of the active workload that has been suspended on the second node by restoring the first part of the executing image of the active workload from storage and migrating the second part of the executing image of the active workload from the memory of the one node.

11. A non-transitory computer-readable medium comprising instructions that are executable in processors of a computer system that includes a cluster of nodes, to carry out a method of scheduling a plurality of workloads for execution in the cluster of nodes, the method comprising:

at each of the nodes, adjusting priority of first workloads that are each running thereon and adjusting priority of second workloads that have been suspended, wherein the nodes include a first node that is adjusting the priority of a first subset of the first workloads that are running on the first node and is adjusting the priority of all of the second workloads, and a second node that is adjusting the priority of a second subset of the first workloads that are running on the second node and is adjusting the priority of all of the second workloads;

at a central orchestrator, receiving the priorities of the first and second workloads from each of the nodes, including the priorities of the first workloads in the first subset and the priorities of the second workloads from the first node, and the priorities of the first workloads in the second subset and the priorities of the second workloads from the second node, and determining that a priority of a suspended workload, which is one of the second workloads, exceeds a priority of an active workload, which is one of the first workloads;

determining, by the central orchestrator, that one of the nodes on which the active workload is running has sufficient resources to execute the suspended workload if the active workload running thereon is suspended; and instructing, by the central orchestrator, the one node to suspend the active workload running thereon and resume running the suspended workload thereon.

12. The non-transitory computer-readable medium of claim 11, wherein the first node is equipped with accelerator hardware and the priority of each of the first workloads running on the first node is adjusted at the first node according to usage of the accelerator hardware by the respective first workload.

13. The non-transitory computer-readable medium of claim 12, wherein, at the first node, the priority of one of the first workloads running on the first node is increased if the accelerator hardware is used by the respective first workload during a time interval and is decreased if the accelerator hardware is not being used by the respective first workload during the time interval.

14. The non-transitory computer-readable medium of claim 13, wherein, at the first node, the priority of each of the first workloads running on the first node is continuously decreased over time.

15. The non-transitory computer-readable medium of claim 14, wherein, at each of the nodes, the priority of each of the second workloads is continuously increased over time.

16. A computer system including a cluster of nodes in which a plurality of workloads are to be executed, wherein the computer system is programmed to carry out a method of scheduling a plurality of workloads for execution therein, the method comprising:

at each of the nodes, adjusting priority of first workloads that are each running thereon and adjusting priority of second workloads that have been suspended, wherein the nodes include a first node that is adjusting the priority of a first subset of the first workloads that are running on the first node and is adjusting the priority of all of the second workloads, and a second node that is adjusting the priority of a second subset of the first workloads that are running on the second node and is adjusting the priority of all of the second workloads;

at a central orchestrator, receiving the priorities of the first and second workloads from each of the nodes, including the priorities of the first workloads in the first subset and the priorities of the second workloads from the first node, and the priorities of the first workloads in the second subset and the priorities of the second workloads from the second node, and determining that a priority of a suspended workload, which is one of the second workloads, exceeds a priority of an active workload, which is one of the first workloads;

determining, by the central orchestrator, that one of the nodes on which the active workload is running has sufficient resources to execute the suspended workload if the active workload running thereon is suspended; and instructing, by the central orchestrator, the one node to suspend the active workload running thereon and resume running the suspended workload thereon.

17. The computer system of claim 16, wherein the first node is equipped with accelerator hardware and the priority of each of the first workloads running on the first node is adjusted at the first node according to usage of the accelerator hardware by the respective first workload.

18. The computer system of claim 17, wherein, at the first node, the priority of one of the first workloads running on the first node is increased if the accelerator hardware is used by the respective first workload during a time interval and is decreased if the accelerator hardware is not being used by the respective first workload during the time interval.

19. The computer system of claim 18, wherein, at the first node, the priority of each of the first workloads running on the first node is continuously decreased over time.

20. The computer system of claim 19, wherein, at each of the nodes, the priority of each of the second workloads is continuously increased over time.

\* \* \* \* \*